United States Patent [19]

Schwartz

[11] Patent Number: 5,500,122
[45] Date of Patent: Mar. 19, 1996

[54] STACKED FLUID-SEPARATION MEMBRANE DISK MODULE ASSEMBLIES

[75] Inventor: A. William Schwartz, Upland, Calif.

[73] Assignee: UOP, Des Plaines, Ill.

[21] Appl. No.: 241,370

[22] Filed: May 11, 1994

[51] Int. Cl.$^6$ .................................................. B01D 63/00
[52] U.S. Cl. .................... 210/321.75; 210/321.84; 210/350; 210/352; 210/232; 210/346; 96/7; 96/11
[58] Field of Search .................... 210/321.75, 381.84, 210/350, 346, 347, 352, 456, 433.1, 445, 454, 232; 96/7, 11

[56] References Cited

U.S. PATENT DOCUMENTS

| | | |
|---|---|---|
| 1,800,625 | 4/1931 | Hall et al. ............................. 210/352 |
| 1,913,886 | 6/1933 | Kennedy . |
| 1,987,316 | 1/1935 | Zimmer . |
| 2,304,618 | 12/1942 | Williams . |
| 2,349,469 | 5/1944 | Sloan . |
| 2,359,475 | 10/1944 | Gauthier . |
| 2,592,527 | 4/1952 | Armstrong . |
| 2,604,994 | 7/1952 | Vocelka ................................. 210/352 |
| 2,757,803 | 8/1956 | Robinson et al. . |
| 2,902,164 | 9/1959 | Dornauf . |
| 3,083,834 | 4/1963 | Pall . |
| 3,152,988 | 10/1964 | Gutkowski et al. . |
| 3,156,106 | 11/1964 | Crane . |
| 3,207,311 | 9/1965 | Kasten ................................... 210/352 |
| 3,259,248 | 7/1966 | Wiegand . |
| 3,322,279 | 5/1967 | Kasten ................................... 210/352 |
| 3,390,546 | 7/1968 | Jewell . |
| 3,439,119 | 4/1969 | Gehrmann . |
| 3,528,554 | 9/1970 | Ogden et al. . |
| 3,570,280 | 3/1971 | Aske . |
| 4,132,649 | 1/1979 | Croopnick et al. .................... 210/347 |
| 4,134,642 | 1/1979 | Kapron et al. . |
| 4,203,305 | 5/1980 | Williams . |
| 4,230,646 | 10/1980 | Ghizzoni . |
| 4,243,536 | 1/1981 | Prolss ................................... 210/456 |
| 4,379,051 | 4/1983 | Hiesinger et al. ....................... 210/231 |
| 4,601,824 | 7/1986 | Dreyer ................................... 210/232 |
| 4,613,436 | 9/1986 | Wight et al. ............................ 210/232 |
| 4,678,578 | 7/1987 | Nodes et al. ........................... 210/445 |
| 4,698,154 | 10/1987 | Mohn et al. ............................ 210/232 |
| 4,707,258 | 11/1987 | Drori ..................................... 210/333.1 |
| 4,759,845 | 7/1988 | Selesnick ............................... 210/450 |
| 4,790,700 | 12/1988 | Schwartzmann . |
| 4,801,381 | 1/1989 | Niesen .................................. 210/321.84 |
| 4,855,048 | 8/1989 | Tang et al. .............................. 264/49 |
| 4,945,956 | 8/1990 | Bueyuekgueclue et al. . |
| 5,069,789 | 12/1991 | Mohn et al. .......................... 210/321.84 |
| 5,106,506 | 4/1992 | Schmidt et al. ...................... 210/321.84 |
| 5,130,020 | 7/1992 | Meckstroth ............................ 210/264 |
| 5,244,578 | 9/1993 | Ohnishi et al. ......................... 210/650 |
| 5,318,704 | 6/1994 | Cosgrove ................................ 210/352 |

FOREIGN PATENT DOCUMENTS

| | | | |
|---|---|---|---|
| 1530200 | 12/1989 | U.S.S.R. ................................. 210/352 |
| 597384 | 9/1944 | United Kingdom ..................... 210/352 |

*Primary Examiner*—Ana M. Fortuna
*Attorney, Agent, or Firm*—Thomas K. McBride; John G. Tolomei

[57] ABSTRACT

A module for separating at least one component from a flowing mixture containing the same, includes a pair of end plates between which a plurality of stacked separation disks are positioned. The separation disks separate at least one component from the flowing mixture and defines a central passageway therethrough. A tensionable conduit is disposed in the fluid passageway to define a pathway for the separated component through at least one of said end plates and cause the end plates to exert a compressive force to the stacked separation disks in response to the conduit being tensioned. In preferred embodiments, the tensionable conduit includes a single or double helix spring which is machined along a major axial extent of its length. An adjustment nut may thus be threadably coupled to at least one (nonmachined) end portion of the conduit so as to adjustably tension the conduit and translate such tension into compressive force exerted to the stack of membranes by the end plates.

8 Claims, 2 Drawing Sheets

STACKED FLUID-SEPARATION MEMBRANE DISK MODULE ASSEMBLIES

CROSS-REFERENCE TO RELATED APPLICATIONS

This application is related to copending and commonly owned U.S. patent application Ser. Nos. 08/241,371 and 08/240,509, each filed on even date herewith, the entire content of each such application being incorporated hereinto expressly by reference.

FIELD OF INVENTION

This invention relates to improvements to membrane modules usefully employed in the field of fluid separations whereby fluid components are separated from a fluid mixture. In preferred forms, the present invention is embodied in a stacked membrane disk module which includes the means by which fluid leakage is prevented by maintaining compressive force on the membrane disks in the stack to accommodate movements of mechanical components during repeated pressurization/depressurization cycles.

BACKGROUND OF THE INVENTION

A variety of commercial processes rely on the use of fluid separation techniques in order to separate one or more desirable fluid components from a mixture. For example, in the production of natural gas, it is typically necessary for the producer to strip carbon dioxide from natural gas in order to meet government regulatory requirements. It is also typically desirable in many chemical processes for hydrogen to be removed and recovered from gaseous process streams.

The use of membranes for fluid separations has achieved increased popularity over other known separation techniques. However, one major disadvantage of membranes for use in fluid separations is that the membranes must be supported in a "package" (sometimes referred to as a "module") which provides the requisite flow path to achieve the desired fluid separation. The membrane package must also exhibit sufficient structural integrity to withstand the pressures needed to effect separation in a given process. These physical demands of membrane packages become especially acute when the membrane package is used in high pressure separation processes (i.e., fluid separation processes having operating pressures of greater than about 500–1000 psi).

Recently, a stacked membrane disk assembly for fluid separations has been proposed in U.S. Pat. No. 4,613,436 issued to William W. Wight et al on Sep. 23, 1986 (hereinafter more simply referenced as "the Wight et al '436 Patent", the entire content of which is expressly incorporated hereinto by reference). According to the Wight et al '436 Patent, a compact stack of alternating layers of membrane disks with layers of feed fluid spacers is suggested. Each such layer is provided with a pair of notches formed in the perimetrical edge and a central aperture. The respective notches and apertures of each layer are registered when stacked such that the registered notches collectively form respective feed and residue channels, while the registered apertures collectively form a permeate channel.

Sealing beads (e.g., bead 40 shown in FIG. 3 and bead 57 shown in FIG. 4 of the Wight et al '436 Patent) extend around the perimetrical edge of the feed fluid spacers from one notch to the other. The sealing beads are thus discontinuous around the edge of the feed fluid spacers in the area of the notches (see, column 9, lines 18–21 of the Wight et al '436 Patent). In use, these discontinuous edge beads cooperate in conjunction with edge seals associated with the distribution plates and feed fluid spacers of the assembly disclosed in the Wight et al '436 Patent (i.e., edge seals 104 and 180 shown in FIGS. 9 and 10, respectively). These edge seals thereby serve as a pressure seal against the interior surface of the pressure vessel in which the assembly is positioned so that the feed and residue channels are collectively defined by the registered notches and a corresponding adjacent interior surface of the pressure vessel wall. In addition, the discontinuous sealing beads employed in the assembly disclosed in the Wight et al '436 Patent serve to fluid-isolate interior regions of the pressure vessel on opposing sides of the stacked membrane disk assembly so as to establish a pressure gradient (e.g., between 1–5 psi) between the feed inlet and residue discharge ports.

While the stacked membrane disk assembly disclosed in the Wight et al '436 Patent represented a significant advance in the art of fluid separations, there exist several practical disadvantages associated with the assembly's required notches and discontinuous sealing beads. As noted above, since the sealing beads are discontinuous, in order to effectively fluid-isolate the feed and residue channels from one another, the beads must make effective sealing contact with the interior surface of the pressure vessel wall. As a consequence, the interior surface of the pressure vessel wall must be machined to very high tolerances to prevent even the slightest gap from existing between the discontinuous sealing beads and the interior surface vessel wall. For example, at high operating pressures of greater than between about 500–1000 psi, a very small gap between the discontinuous sealing beads and the interior surface vessel wall could cause failure of the membrane assembly (i.e., prevent the membrane assembly from performing its intended fluid separation functions).

Improvements to the stacked membrane disk assembly disclosed in the Wight et al '436 Patent are proposed in the above-referenced copending and commonly owned U.S. patent application Ser. No. 08/241,371. In this regard, a principal improvement disclosed in that copending Patent Application is embodied in a self-contained stacked membrane assembly. That is, the membrane module assembly disclosed in that copending Patent Application is itself pressure-isolated and thus does not require edge seals to be formed with the interior surface of the pressure vessel wall. As a result, the only requirement on the internal dimensions of the pressure vessel is that sufficient space be provided to house the membrane assembly. In other words, the longitudinal and/or latitudinal size of the pressure vessel wall can be virtually any dimension since the perimetrical edge of the membrane assembly does not need to be sealed against the interior pressure vessel wall in order to perform its intended fluid-separation functions.

In use, membrane module assemblies are subjected to repeated pressurization and depressurization cycles due to periodic equipment maintenance and day-to-day processing needs requiring equipment shut-down. When stacked membrane disk modules of the type disclosed in the copending Patent Application cited above are pressurized, stone of the structural components may undergo irreversible dimensional deformation. For example, the membrane and/or permeate carrier sheets in the membrane disks may be dimensionally "thinned" when subjected to relatively high pressures (sometimes on the order of greater than 1000 psi) of a given fluid separation process. At the same time, however, the seals employed will typically be sufficiently elastic and/or compressible so that they will maintain a fluid and pressure tight seal with the membrane disks when pressurized.

However, the seals in the module may not be capable of elastically responding to a rapidly decreasing pressure when the module is depressurized sufficient to maintain a reliable seal with the membrane disks. As a result, it is likely that the seals will be displaced and/or lose sealing contact with the membrane disk during depressurization which, in turn, causes fluid leakage to occur if the module is subsequently attempted to be repressurized. Such fluid leakage will thus cause the module to fail to preform its intended fluid-separation functions. Once fluid leakage has occurred, therefore, the only alternative is to remove the module from service and rebuild the membrane disk and seal components.

It would therefore be desirable if means were provided which would allow a stacked membrane disk assembly to undergo repeated pressurization/depressurization cycles without failure (e.g., without experiencing fluid leakage on depressurization). According to the invention disclosed and claimed in the above-cited copending U.S. patent application Ser. No. 08/240,509, such means are provided in the form of an assembly having a perforated permeate tube and biasing structures.

It would, however, be especially desirable if the permeate tube and the biasing structure were provided as an integral unit (e.g., so as to promote ease of assembly and to reduce module space). It is towards fulfilling such a need that the present invention is directed.

SUMMARY OF THE INVENTION

Broadly, the present invention is embodied in a stacked membrane disk module having a number of membrane disks interleaved with sealing layers and which includes an integral unit functioning as both a permeate tube for the permeate fluid and a force biasing structure for maintaining compressive forces between the membrane disks and interleaved sealing layers.

In an especially embodiment of this invention, the membrane disks will each include a central first aperture and a pair of second apertures which are radially spaced from the central first aperture. These apertures will thus be respectively registered when a number of such membrane disks (which might be more than 100) are stacked between a pair of end plates so as to establish a central fluid passageway and a pair of second fluid passageways.

The permeate tube employed in the modules according to this invention will necessarily include an integral helical spring (more preferably a bi-helical spring) machined along a major segment of its axial length so as to provide the requisite force-biasing functions in addition to establishing a passageway for the permeate fluid. That is, the permeate tube is positioned within the central fluid passageway and serves as a conduit to pass a permeate fluid to the exterior of the module. Thus, the permeate fluid is allowed to flow radially into the interior of the tube through the interstices of the integral helical spring. In addition, the permeate tube is connected to end plates between which the membrane disks are stacked in such a manner that the helical spring thereof is maintained under tension. This tension force is thereby translated to the end plates so that they apply a compressive force to the membrane disks in the stack.

In such a manner, fluid leakage is prevented by virtue of the central permeate tube maintaining compressive force on the membrane disks in the stack to accommodate movements of mechanical components during repeated pressurization and depressurization cycles of the module. Thus, the central permeate tube employed in the modules of this invention serves the dual function of providing a fluid conduit through the central passageway of the stacked membrane disks while also maintaining a compressive force on the membrane disks in the stack to prevent fluid leakage.

Further aspects and advantages of this invention will become more clear after careful consideration is given to the detailed description of the preferred exemplary embodiments thereof which follows.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
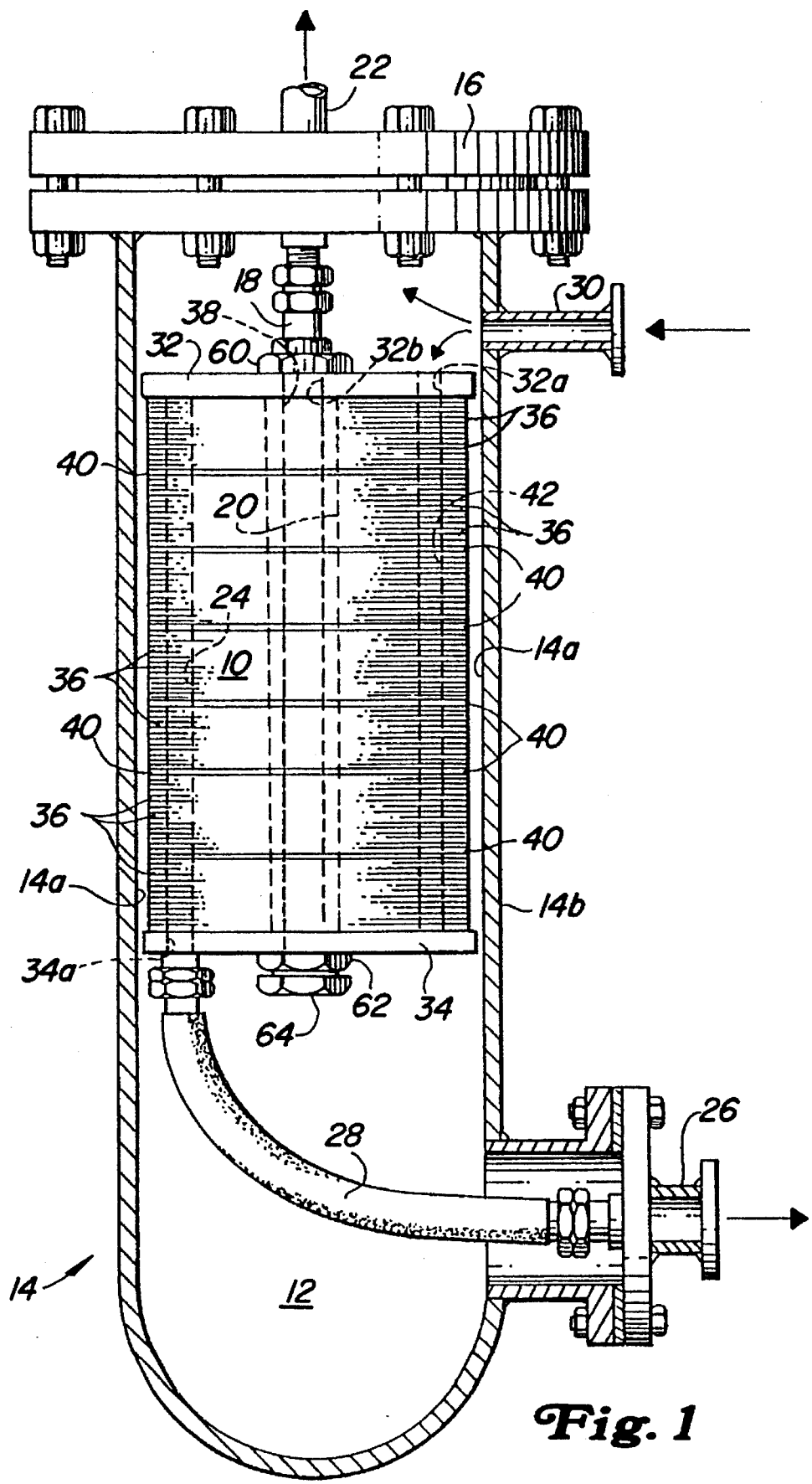
FIG. 1 is a cross-sectional elevational view of a pressure vessel which houses a preferred stacked membrane disk module according to the present invention.

Accompanying FIG. 1 depicts an exemplary stacked membrane module 10 according to this invention positioned within the interior chamber 12 of pressure vessel 14. The module 10 is dependently supported by the upper flange 16 of the pressure vessel 14 via the pipe stem 18 which fluid-connects the permeate passageway 20 defined centrally within the module 10 to a conduit 22 external of the pressure vessel 14 to allow the collected permeate fluid to be transferred to another location.

The residue passageway 24 defined within the module 10 is, in turn, fluid-connected to the discharge port 26 of pressure vessel 14 by conduit 28. Preferably, the conduit 28 is flexible but is of sufficient mechanical strength to withstand the pressure differential which exists between the feed fluid introduced into the pressure vessel via inlet port 30 and the pressure of the residue fluid within the conduit 28. Thus, virtually any flexible conduit may be employed such as reinforced elastomeric conduits, corrugated-type conduits or the like.

The module 10 includes axially spaced-apart end plates 32, 34 (preferably formed of metal) between which a number of membrane disks (some of which are identified in FIG. 1 by reference numeral 36) are positioned in registered stacked arrangement. A compressive force on the stack of membrane disks 36 within the module 10 is provided by a permeate tube 38 having an integral helical spring formed along a major extent of its axial length as will be discussed in greater detail below. In order to increase the structural integrity of the module 10, rigid reinforcement plates 40 provided with appropriate apertures may be interposed at desired regular intervals (e.g., between every 25th and 26th membrane disk 36 in the stack).

The module 10 also defines a feed fluid passageway 42 which communicates with opening 32a in end plate 32. Feed fluid containing at least one fluid component to be separated is thus introduced into the pressure vessel 14 at inlet port 30 and is directed into the feed fluid passageway 42. The end plate 32 also has an opening 32b which allows the central permeate passageway 20 to communicate with the stem 18.

The end plate 34, on the other hand, defines a residue opening 34a which allows fluid communication between the residue passageway 24 within the module 10 and the conduit 28.

It will be observed in FIG. 1 that the exterior circumferential surface of the module 10 is spaced from the interior surface 14a of pressure vessel wall 14b. As such, the chamber 12 will be at a pressure condition corresponding to the pressure of the feed fluid introduced into the pressure vessel 14 via port 30. That is, according to the present invention, the exterior circumferential surface of the module 10 is not sealed against the interior surface 14a of pressure vessel wall 14b and, as such, does not establish different pressure conditions within the chamber 12.

Figure 2:
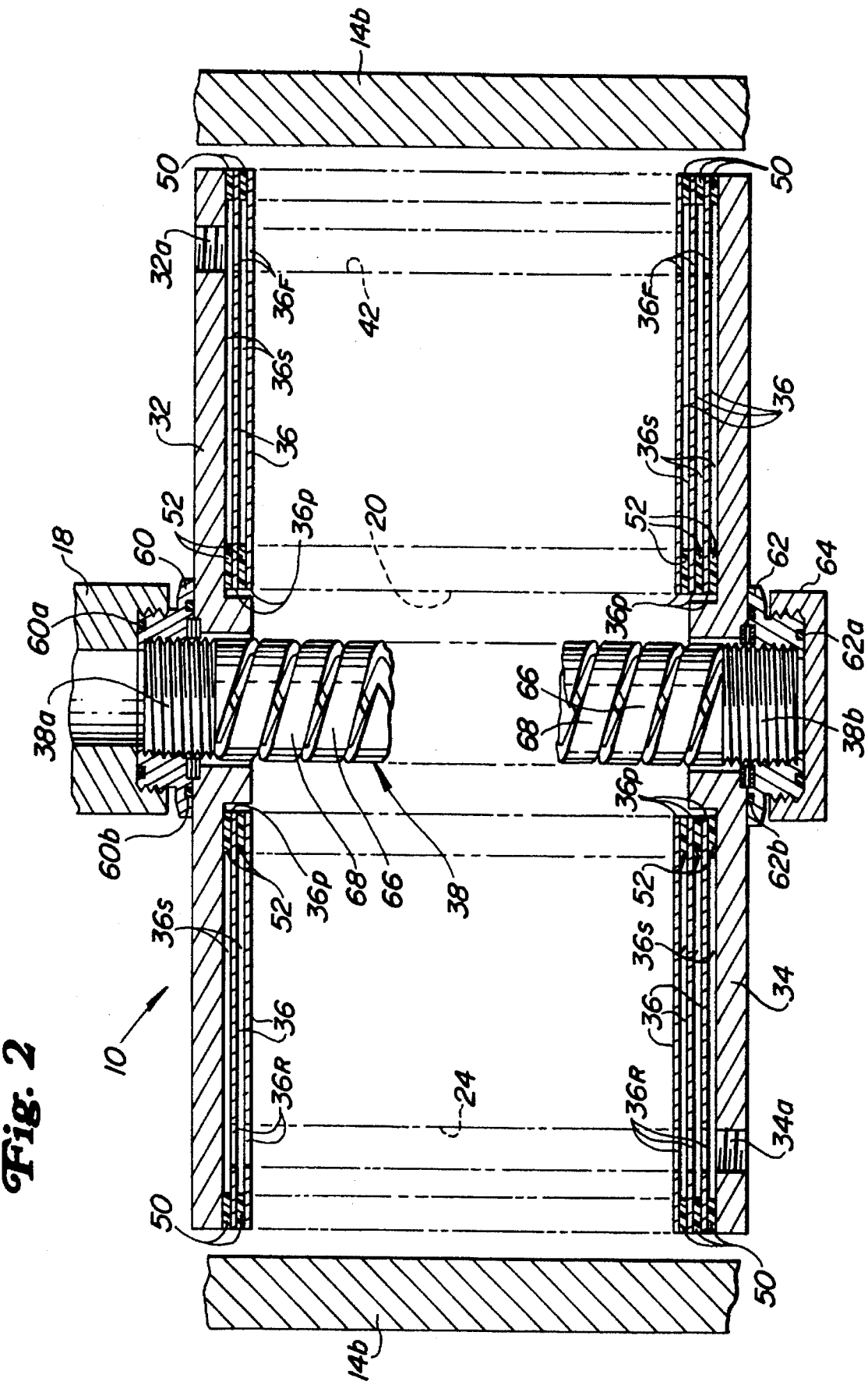
FIG. 2 is a cross-sectional elevational view of a preferred stacked membrane disk module particularly showing the preferred permeate tube according to the present invention.

A representative number of structural components which form the module 10 is shown in accompanying FIG. 2. As mentioned briefly above, the module 10 is comprised of a number of stacked membrane disks 36 positioned between the end plates 32 and 34, it being understood that several hundred or several thousand such membrane disks (which may optionally have interposed a reinforcement plate 40) will be provided as needed for adequate fluid separation. Important to the present invention, however, is the presence of low and high pressure seal rings 50, 52, respectively, positioned concentrically between adjacent components in the module— that is, between adjacent ones of the membrane disks 36, or between the end-most membrane disk 36 in the stack and an adjacent one of the end plates 32, 34, or between a membrane disk 36 and an adjacent one of the reinforcement plates 40.

The low and high pressure seals 50, 52, respectively, are interposed concentrically between adjacent membrane disks 36 in the module 10 and serve to create the desired flow of fluid relative to the stack of membrane disks 36. In addition to providing necessary sealing functions, the low and high pressure seals 50, 52 define a slight, but significant, clearance space $36_S$ between immediately adjacent membrane sheets $36_M$ of the membrane disks 36 in the stack to allow for fluid flow between the feed and residue apertures $36_F$ and $36_R$. Similarly, this clearance space $36_S$ is defined between the end-most membrane disks 36 in the stack and the end plates 32, 34 (and between a membrane disk 36 and an adjacent reinforcing plate 40, if present) by virtue of the annular seals 50, 52.

To accomplish this function, the low pressure seal 50 is positioned in annular registered relationship to the perimetrical edge regions of the stacked membrane disks 36 such that the registered feed and residue apertures $36_F$ and $36_R$, respectively, formed in each of the membrane disks 36 are positioned radially inwardly thereof. That is, the low pressure seal 50 is positioned radially outwardly of the apertures $36_F$ and $36_R$ so as to form a continuous seal about the perimetrical edge region of the membrane discs 36. The high pressure seal 52, on the other hand, is positioned concentrically around the central permeate apertures $36_P$ formed in each membrane disk 36. Thus, the high pressure seal 52 fluid-isolates the central permeate fluid passageway 20 (established by virtue of registered central permeate openings $36_P$) from the feed and residue passageways 42 and 24 (established by virtue of registered feed and residue openings $36_F$ and $36_R$, respectively). The low pressure seal 50, on the other hand, fluid-isolates the feed and residue fluid passageways $36_F$ and $36_R$, respectively, from the pressure condition existing within the chamber 12 of the pressure vessel 14. In other words, the low pressure seals 50 serve to pressure isolate the interior of the module 10 from the pressure condition existing within the pressure vessel 14.

The permeate tube 38 is coaxially positioned within the central passageway 20 of the stack of membrane modifies 36 and extends between end plates 32, 34. In this regard, the permeate tube 36 includes threaded end portions 36a, 36b which are threadably coupled to adjustment nuts 60, 62, respectively. The adjustment nut 60 is, in turn threadably coupled to stem 18 so as to allow permeate fluid to flow to a location outside of the pressure vessel 12 and is sealed against fluid leakage by means of O-rings 60a, 60b. The adjustment nut 62, on the other hand, is sealed against fluid leakage by means of cap 64 and O-rings 62a, 62b. It will be appreciated that cap 64 would not be present if several modules 10 were connected in series via the permeate tubes 38.

The permeate tube 38 most preferably is provided with unitary bihelical springs 66, 68 which are formed by machining along a major extent of the permeate tube's axial length between threaded ends 38a, 38b. The bihelical springs 66, 68 are thus 180° out of phase so as to be intercalated along the permeate tube's axial length. By providing bihelical springs 66, 68 unitary with the permeate tube 38 along its axial length, a pair of balanced moments are generated thereby ensuring that a compressive force will be applied evenly to the membrane disks 36.

In use, the disk membranes will be assembled with the interleaved seal rings 50, 52 between the end plates 32, 34 as discussed above. The permeate robe 38 may then be positioned within the permeate fluid passageway 20 and coupled to adjustment nuts 60, 62. The adjustment nuts 60 and/or 62 may then be tightened so as to place the unitary springs 66, 68 forming the permeate tube 38 under substantial axial tension (e.g., several thousand pounds-force). This axial tensioning of the springs 66, 68 will thereby expand the interstitial space between adjacent turns of the springs 66, 68 to allow permeate fluid in the passageway 20 to enter the interior of the tube 38 and be directed thereby outside of the pressure vessel 12. At the same time, the longitudinal tension applied to the permeate tube 38 will be translated via adjustment nuts 60, 62 bearing against end plates 32, 34, respectively, into a corresponding substantial compressive force acting on the stacked membrane disks 36.

Thus, any structural deformation that may occur during pressurization of the module 10 will be accommodated upon depressurization by means of the substantial compressive force that is generated by the tensioned permeate tube 38. As such, the seals rings 50, 52 will remain in sealing contact with adjacent elements in the module 10 (e.g., membrane disks 36, end plates 32, 34 or stiffener plates 40 as may be the case) and will permit the module to be subjected to repetitive pressurization/depressurization cycles.

While the permeate tube 38 has been depicted in a particularly preferred embodiment which includes unitarily formed bihelical springs 66, 68, it will be appreciated that only a single helical spring could be provided. However, a single helical spring may not be desirable in all end use applications due to the possibility that an internal force moment may occur thereby resulting in an uneven compressive force being exerted on the stacked membrane disks 36. However, for relatively low pressure modules (i.e., those operating at pressures substantially less than about 500 psi), a single helical spring may be satisfactory. Of course, the permeate tube could likewise be provided with three or more such intercalated springs if even greater force balancing is desired, but at a loss of spring rate.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluid separation module comprising:

a plurality of membrane disks each having a central first aperture and a pair of second apertures radially spaced from said central first aperture, said membrane disks being stacked relative to one another so that said central first apertures thereof are registered to establish a central fluid passageway, and so that said second apertures thereof are registered to establish a respective pair of second fluid passageways;

sealing layers interposed between adjacent stacked membrane disks to fluid isolate said first fluid passageway from said pair of second fluid passageways and to seal a peripheral edge region of said membrane disks surrounding said pair of second fluid passageways; and a permeate tube positioned coaxially with said central fluid passageway to provide a conduit for fluid in said central fluid passageway, said tube is provided with integral compression means to maintain a compressive force on said stacked membrane disks, whereby repeated pressurization and depressurization of said module may occur by virtue of said compressive force, maintaining said sealing layers in sealing contact with said adjacent membrane disks.

2. A module as in claim 1, wherein said integral compression means in said permeate tube includes at least one unitary helical spring.

3. A module as in claim 1, wherein said integral compression means in said permeate tube includes a unitary bihelical spring.

4. A module as in claim 1, wherein said module includes a pair of opposed end plates between which said membrane disks are stacked, and wherein said permeate tube exerts said compressive force to said pair of end plates.

5. A module as in claim 4, wherein said permeate tube includes end portions each coupled to a respective said end plates to allow for relative axial displacements, and a helical spring formed in said permeate tube and extending axially between said end portions.

6. A module as in claim 5, further comprising at least one adjustment nut threadably coupled to one of said ends of said permeate tube such that turning movements to said adjustment nut places said helical spring of said permeate tube trader tension, and wherein said adjustment nut translates said tension of said helical spring into said compressive force exerted by said end plates.

7. A module as in claim 6, wherein both ends of said permeate tube include a respective adjustment nut.

8. A fluid-separation system comprising a vessel, and at least one module according to claim 1.

* * * * *